United States Patent [19]
Stoneman

[11] Patent Number: 5,957,089
[45] Date of Patent: Sep. 28, 1999

[54] TAIL GATE

[76] Inventor: David J. Stoneman, Box 121, Fisher Branch, Manitoba, Canada, R0C 0Z0

[21] Appl. No.: 08/905,143

[22] Filed: Aug. 1, 1997

[51] Int. Cl.$^6$ .................................................... A01K 1/00
[52] U.S. Cl. .......................... 119/524; 119/843; 119/416; 49/381
[58] Field of Search .................................. 119/510, 524, 119/840, 843, 502, 520, 14.03, 416, 426, 514; 16/86.1, 86.2; 49/381, 197, 204, 55, 263, 272

[56] References Cited

U.S. PATENT DOCUMENTS

| | | | |
|---|---|---|---|
| 1,385,563 | 7/1921 | Louden | 119/510 X |
| 3,166,044 | 1/1965 | Darling | 119/524 |
| 5,285,746 | 2/1994 | Moreau | 119/520 X |
| 5,584,261 | 12/1996 | Hart et al. | 119/524 X |
| 5,622,009 | 4/1997 | Healey | 49/507 |

FOREIGN PATENT DOCUMENTS

| | | | |
|---|---|---|---|
| 875897 | 8/1961 | United Kingdom | 119/502 |

*Primary Examiner*—Michael J. Carone
*Assistant Examiner*—James S. Bergin
*Attorney, Agent, or Firm*—Adrian D. Battison; Murray E. Thrift

[57] ABSTRACT

A tailgate for preventing cattle from backing up while in a guide chute is described. The tail gate comprises a tube, angle brackets and a gate section. The angle brackets are arranged to be fitted into the tube such that the angle brackets can be attached to horizontal or vertical surfaces. The gate section is arranged to pivot about the tube from one side of the tube only so that cattle may pass freely from one side of the tail gate but are prevented from passing from the opposite side. As a result of this arrangement, cattle contacting the gate from the opposite side of the tail gate will reflexively remain in place. This in turn prevents the cattle from backing up and speeds up the flow of cattle through the chute. The tail gate is arranged to be fitted into chutes of various widths at any point along the chute fitting and the height of the gate section can be varied for use with animals of different sizes.

9 Claims, 2 Drawing Sheets

TAIL GATE

The present invention relates to a tail gate for an animal guide chute.

BACKGROUND OF THE INVENTION

For as long as cattle producers have been using head gates and chutes, cattle have been backing out of the system. Common solutions to this problem include pushing the cows up the chute and/or holding the cows in place by shoving a fence post across the chute. However, these methods can cause stress in the livestock and may also injure the cattle and/or the workers. Clearly, a device for holding cows in place without causing injury or stress is needed.

SUMMARY OF THE INVENTION

It is one object of the invention, therefore, to provide a tail gate for an animal guide chute arranged to hold cows in place as a result of the cows own reflex action.

According to the invention, there is provided a tail gate for an animal guide chute comprising:

- a tube comprising hollow ends, a side surface and an upper surface;
- a gate section attached to the tube by joining means for pivoting motion thereabouts, said gate section pivoting from a down position wherein the gate section rests against the side surface of the tube such that the gate section projects downward from the tube and an up position wherein the gate section rests upon the upper surface of the tube such that the gate section projects laterally from the tube;
- bracket members arranged for a sliding fit into the hollow ends of the tube such that the length of the tail gate is varied by adjusting the position of the respective bracket members within the tube, said bracket members including connecting means for attaching the tail gate to a support structure; and
- tightening means for fixing the position of the bracket members within the tube. Thus, the length of the tail gate may be varied by varying the degree to which the bracket members are inserted into the hollow ends of the tubes. As a result of this arrangement, the tail gate is arranged to be mounted onto animal guide chutes of varying widths. Furthermore, the gate section is arranged to pivot from one side of the tail gate only. Thus, the gate section cannot be opened by animals once past the tail gate. That is, when animals back into the gate, the gate section does not pivot, thereby causing the animal to remain in place as a result of its own reflex action. As a result, the flow of animals through the chute is sped up while the labor required is significantly reduced.

Preferably, the bracket member comprises a horizontal portion arranged for a sliding fit within the tube and a right angle bracket connected to the horizontal portion such that the right angle bracket is perpendicular to the horizontal portion.

The connecting means may comprise a plurality of apertures in the right angle bracket. The apertures may be staggered for attaching the tail gate to a wooden support structure. As a result of this arrangement, the tail gate may be mounted onto wooden or metal structures.

Preferably, the tube and the horizontal portion have a substantially square shape such that the bracket members are inserted into the tube in one of two orientations: a first orientation wherein the right angle bracket is parallel to the upper surface of the tube for attaching the tail gate to horizontal support structures and a second orientation wherein the right angle bracket is perpendicular to the upper surface of the tube for attaching the tail gate to vertical support structures.

Preferably, the gate section comprises a top portion and a bottom portion and the bottom portion is encased in rubber. As a result of this arrangement, contact with the bottom portion of the gate section does not injure the livestock.

The tail gate may include locking means for locking the gate section in the up position. The locking means may comprise a rod arranged to slide into apertures located on the upper surface of the tube arranged such that the gate section rests on the rod and cannot pivot. Alternatively, the locking means may comprise a hook for holding the gate section in the up position. Thus, the gate section may be locked in the up position if the animals must be backed out of the chute.

The joining means may comprise a sliding collar for mounting the gate section onto the tube such that the gate section moves up and down relative to the tube. Thus, the height of the gate section relative to the animal guide chute may be varied so that the tail gate can be used with livestock of various sizes.

Preferably, the gate section includes a vertical bar. This additional vertical bar prevents livestock from getting their heads stuck in the gate section.

Thus, the above-described tail gate eliminates the problem of animals backing out of a chute by holding the animal in place as a result of their own reflex action. That is, once the animal backs into the tail gate and the tail gate does not move, the animal remains in place. As a result, the flow of animals through the chute is sped up and the labor required to complete the task is greatly reduced. Furthermore, the above-described tail gate is arranged to be used with animal guide chutes of various widths and the tail gate may be attached to either vertical or horizontal support structures. Finally, the height of the gate section may be varied so that the tail gate may be used with livestock of various sizes.

DETAILED DESCRIPTION

Figure 1:
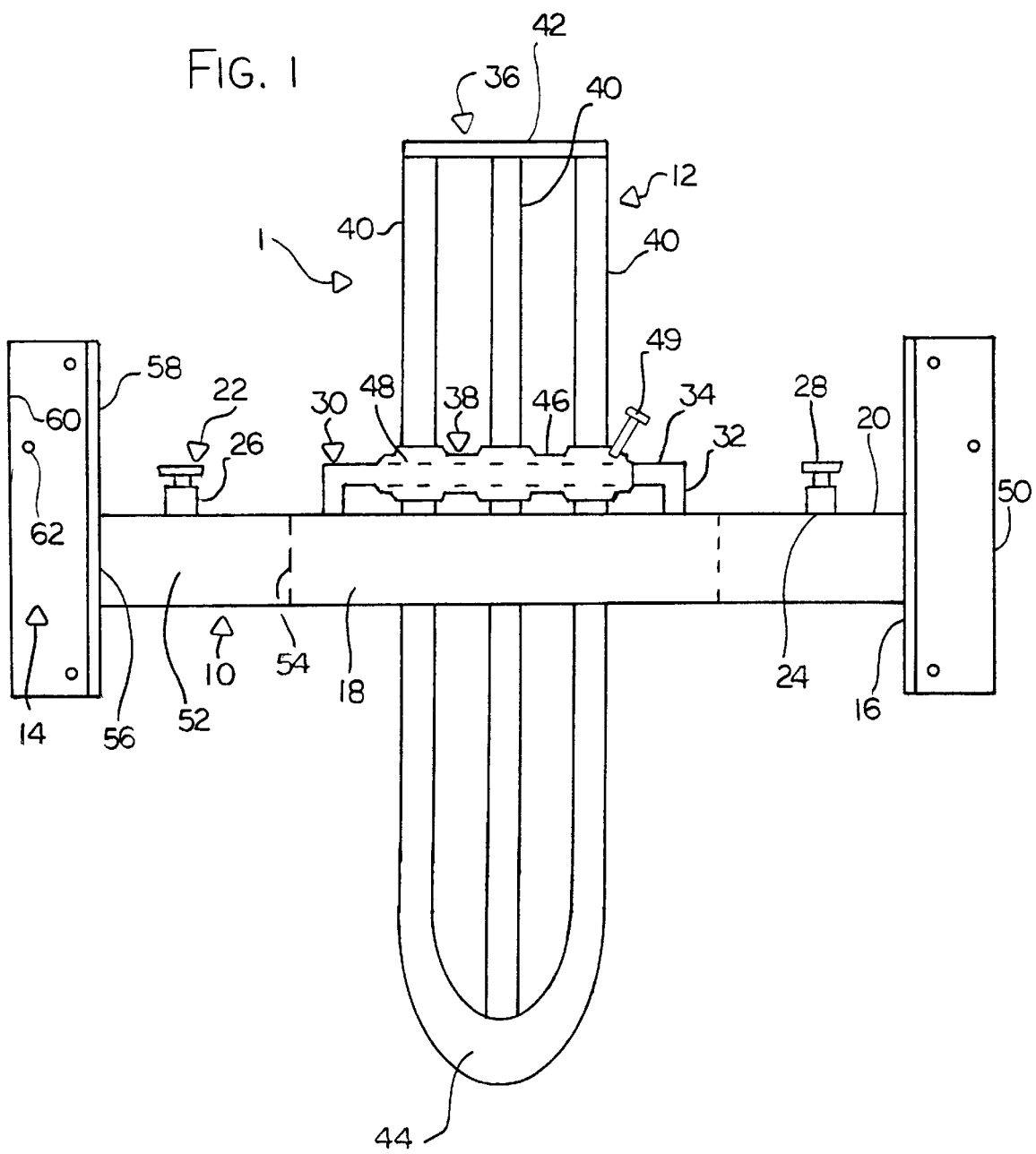
FIG. 1 is a front view of the tail gate.

Referring to the drawings, a tail gate 1 for an animal guide chute comprises a tube 10, a gate section 12 and bracket members 14.

The tube 10 comprises hollow ends 16 for insertion of the bracket members 14 therein as described below, a front surface 18 and a top surface 20. In addition, the tube 10 includes tightening means 22 for fixing the position of the bracket members 14 within the tube 10 as described below. In this embodiment, the tightening means 22 comprise two apertures 24 in the top surface 20 of the tube 10, each of the apertures 24 located proximal to one of the hollow ends 16 of the tube 10. The apertures 24 are surrounded by a rib 26 that extends in an upward direction from the tube 10. In operation, bolt members 28 are inserted into the apertures 24 such that the bolt members 28 pass through the top surface 20 of the tube 10 and contact the bracket members 14 inserted into the hollow ends 16 of the tube 10, thereby exerting a downward pressure onto the bracket members 14 and fixing the bracket members 14 in place within the tube 10 as described below. The tube 10 further includes a pivot member 30 mounted onto the top surface 20 of the tube 10.

The pivot member 30 comprises two vertical members 32 extending from the top surface 20 of the tube 10 and a shaft 34 interconnecting the two vertical members 32 such that the shaft 34 is above the top surface 20 and parallel to the top surface 20 of the tube 10. It is of note that the pivot member 30 is arranged such that the pivot member 30 is proximal to the front surface 18 of the tube 10. In this embodiment, the tube 10 has a length of approximately twenty inches.

The gate section 12 comprises a gate 36 and a sleeve member 38. In this embodiment, the gate 36 comprises three vertical bars 40, a straight top bar 42 and a curved bottom portion 44. Specifically, the three vertical bars 40 are arranged to depend downward from the straight top bar 42, two from either end of the straight top bar 42 and one from approximately the mid-point of the straight top bar 42. The three vertical bars 40 terminate at the curved bottom portion 44 as shown in FIG. 1. The middle vertical bar 40 maybe bowed to provide additional strength. The sleeve member 38 comprises a cylindrical portion 46 arranged to be fitted over the shaft 34 of the pivot member 30 such that the sleeve member 38 pivots therearound as described below and a slot portion 48 extending laterally from the cylindrical portion 46 for insertion of the gate 36. Specifically, the slot portion 48 is arranged to accept the three vertical bars 40 of the gate 36 for a sliding fit therein as described below. The slot portion 48 includes a locking pin 49 for locking the gate 36 within the slot portion 48 such that the gate 36 does not slide freely within the slot portion 48 as described below. In this embodiment, the curved bottom portion 44 is encased in rubber, as described below. Furthermore, in this embodiment, the gate 36 has a height of approximately twenty-nine inches.

The bracket member 14 comprises an angle bracket 50 for attaching the tail gate 1 to a support structure as described below and a horizontal portion 52 for insertion into the hollow ends 16 of the tube 10 as described below. The horizontal portion 52 comprises a first end 54 arranged to be inserted into the hollow ends 16 of the tube 10 and a second end 56 connected to the angle bracket 50. The angle bracket 50 comprises a first plate 58 connected to the second end 56 of the horizontal portion 52 such that the first plate 58 is perpendicular to the horizontal portion 52 and a second plate 60 connected at a right angle to the first plate 58. The second plate 60 includes a plurality of apertures 62 for connecting the second plate 60 to a support structure as described below. In this embodiment, the apertures 62 in the second plate 60 are staggered for attaching the tail gate to a wooden support structure.

Of note is that in this embodiment, the tube 10 and the horizontal portion 52 of the bracket member 14 have substantially square shapes. As a result of this arrangement, the bracket members 14 may be inserted into the hollow ends 16 of the tube 10 in one of two orientations: a first orientation wherein the horizontal portion 52 is rotated and inserted so the second plate 60 of the angle bracket 50 is parallel to the top surface 20 of the tube 10 for attaching the tail gate 1 to horizontal support structures and a second orientation wherein the horizontal portion 52 is rotated and inserted so the second plate 60 of the angle bracket 50 is perpendicular to the top surface 20 of the tube 10 for attaching the tail gate 1 to a vertical support structure.

Figure 2:
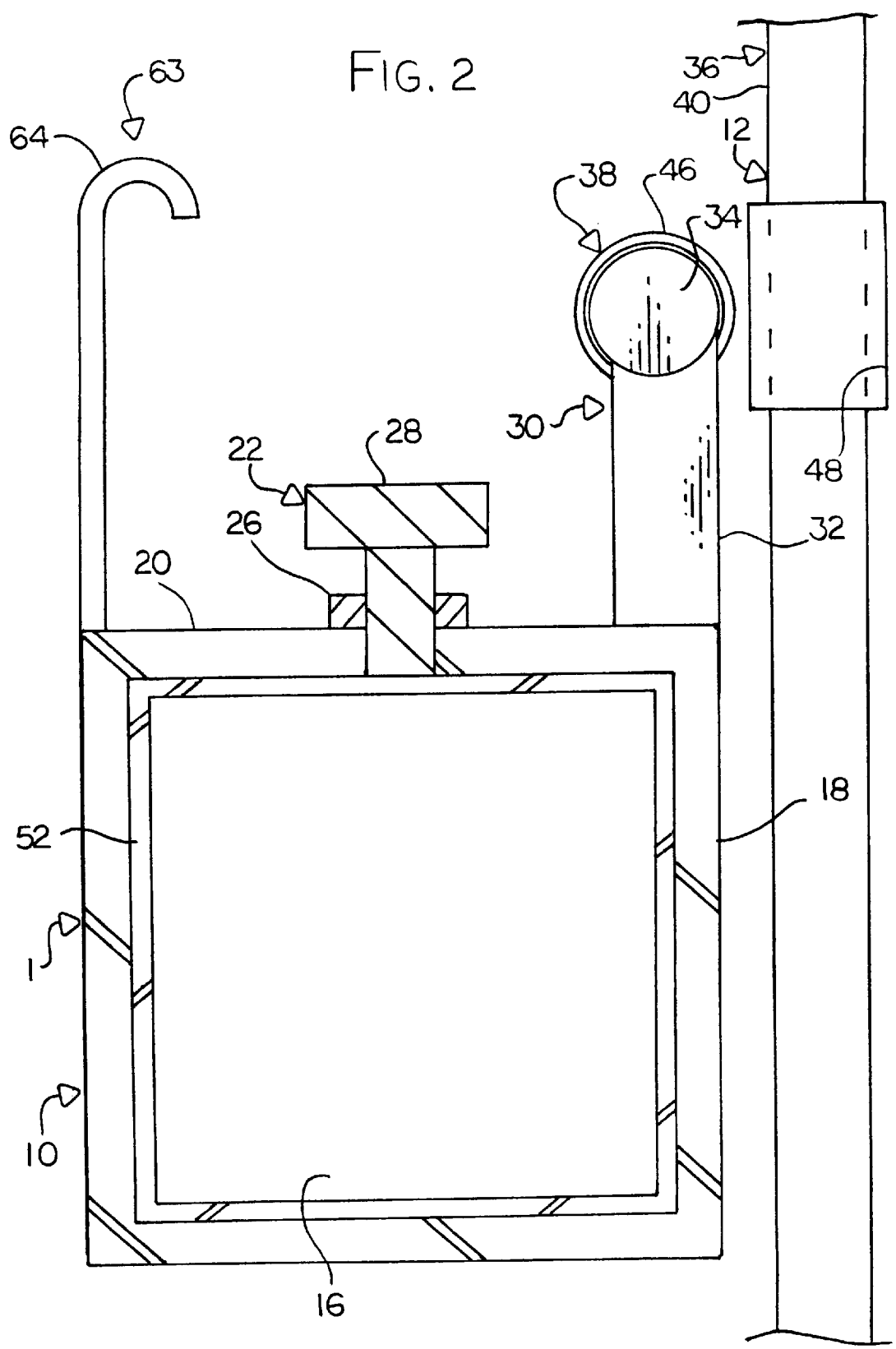
FIG. 2 is a side view in cross section of the tail gate.

The tail gate 1 is assembled as follows. The slot portion 48 of the sleeve member 38 is fitted around the three vertical bars 40 of the gate 36 such that the three vertical bars 40 are arranged for a sliding fit therein. The locking pin 49 is then tightened such that the locking pin 49 contacts the gate 36, thereby holding the gate 36 in place within the slot portion 48 so that the gate 36 does not slide freely therein. The cylindrical portion 46 of the sleeve member 38 is fitted over the shaft 34 of the pivot member 30 such that the gate 36 pivots therearound. Specifically, the gate 36 pivots from a down position wherein the three vertical bars 40 rest against the front surface 18 of the tube 10 and the gate 36 projects downward from the tube 10 and an up position wherein the three vertical bars 40 rest upon the top surface 20 of the tube 10 such that the gate 36 projects laterally from the tube 10. The tail gate 1 includes locking means for locking the gate in the up position. The locking means may comprise a rod arranged to slide into apertures located on the top surface 20 of the tube 10 arranged such that the gate 36 rests on the rod and cannot pivot. Alternatively, the locking means 63, shown on FIG. 2, may comprise a hook 64 for holding the gate 36 in the up position. The bracket members 14 are then inserted into the hollow ends 16 of the tube 10. Specifically, the first ends 54 of the horizontal portions 52 of the bracket members 14 are inserted into the hollow ends 16 of the tube 10. In this embodiment, the length of the tail gate 1 may be varied from twenty inches to thirty-six inches. Specifically, the length of the tail gate 1 may be varied by varying the degree to which the horizontal portions 52 are inserted into the tube 10. Once the desired length is attained, the bolt members 28 are inserted into the apertures 24 in the top surface 20 of the tube 10 and tightened down such that the bolt members 28 exert a downward pressure on the horizontal portion 52 of the bracket members 14, thereby locking the bracket members 14 in place within the tube 10.

The tail gate 1 is attached to a support structure, such as, for example, an animal guide chute, by adjusting the length of the tail gate 1 as described above and aligning the second plate 60 of the bracket members 14 with the support structure. As noted above, the bracket members 14 may be inserted into the tube 10 such that the second plate 60 of the angle bracket 50 is parallel to the top surface 20 of the tube 10 for attaching the tail gate 1 to a horizontal support structure or such that the second plate 60 of the angle bracket 50 is perpendicular to the top surface 20 of the tube 10 for attaching the tail gate 1 to a vertical support structure. Once the second plate 60 is aligned, securing means such as nails, screws, or nuts and bolts are passed through the apertures 62 in the second plate 60, thereby fastening the tail gate 1 to the support structure. It is of note that the tail gate 1 is arranged to be attached at any position along a chute fitting. The height of the gate 36 relative to the ground, that is the portion of the gate 36 that projects downward from the tube 10 is adjusted by releasing the locking pin 49 and sliding the gate 36 within the slot portion 48 until the gate 36 is in the desired position and then tightening the locking pin 49.

In operation, livestock traveling along the animal guide chute encounter the tail gate 1 with the gate 36 set in the down position. As the animal contacts the gate 36, the gate 36 pivots from the down position wherein the three vertical bars 40 are in contact with the front surface 18 of the tube 10 toward the up position wherein the three vertical bars 40 rest on the top surface 20 of the tube 10. Of note is that the curved bottom portion 44 of the gate 36 is encased in rubber so that the animal is not injured as a result of contact with the gate 36. Once the animal passes through the gate 36, contact is released and the gate 36 pivots back to the down position. If the animal attempts to move back down the chute, that is, in the direction from whence it came, the animal again encounters the gate 36 of the tail gate 1. However, in this instance, pressure is applied to the gate 36 from the opposite side of the tail gate 1. As a result, the gate 36 contacts the front surface 18 of the tube 10 and does not pivot, remaining in the down position. This in turn holds the animal in place as a result of its natural reflex action. As a result of this arrangement, livestock stress and risk of injury to livestock as well as workers is significantly reduced. In addition, the flow of livestock through the chute is sped up and the amount of labor required is significantly reduced.

Alternatively, the dimensions of the components of the tail gate 1 may be varied. The gate 36 may be varied such that there are only two vertical bars.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A tail gate for an animal guide chute comprising:

a tube comprising hollow ends, a side surface and an upper surface;

a gate section attached to the tube by joining means for pivoting motion thereabouts, said gate section pivoting between a down position wherein the gate section rests against the side surface of the tube such that the gate section projects downward from the tube and an up position wherein the gate section rests upon the upper surface of the tube such that the gate section projects laterally from the tube;

bracket members arranged for a sliding fit into the hollow ends of the tube such that the length of the tail gate is varied by adjusting the position of the respective bracket members within the tube, said bracket members including connecting means for attaching the tail gate to a support structure; and tightening means for fixing the position of the bracket members within the tube.

2. The tail gate according to claim 1 wherein each bracket member comprises a horizontal portion arranged for a sliding fit within the tube and a right angle bracket connected to the horizontal portion such that the right angle bracket is perpendicular to the horizontal portion.

3. The tail gate according to claim 2 wherein the connecting means comprises a plurality of apertures in the right angle bracket.

4. The tail gate according to claim 3 wherein the apertures are staggered for attaching the tail gate to a wooden support structure.

5. The tail gate according to claim 2 wherein the tube and the horizontal portions have a substantially square shape such that the bracket members are inserted into the tube in one of two orientations: a first orientation wherein each right angle bracket is parallel to the upper surface of the tube for attaching the tail gate to horizontal support structures and a second orientation wherein each right angle bracket is perpendicular to the upper surface of the tube for attaching the tail gate to vertical support structures.

6. The tail gate according to claim 1 wherein the gate section comprises a top portion and a bottom portion and the bottom portion is encased in rubber.

7. The tail gate according to claim 1 including locking means for locking the gate section in the up position.

8. The tail gate according to claim 1 wherein the joining means comprises a sliding collar for mounting the gate section onto the tube such that the gate section moves up and down relative to the tube.

9. The tail gate according to claim 1 wherein the gate section includes a vertical bar.

* * * * *